July 16, 1940.   F. E. HUSSONG   2,208,553
CONTROL VALVE FOR VACUUM OPERATED BRAKES
Original Filed March 30, 1936   2 Sheets—Sheet 1

INVENTOR
Floyd E. Hussong
By
his ATTORNEY.

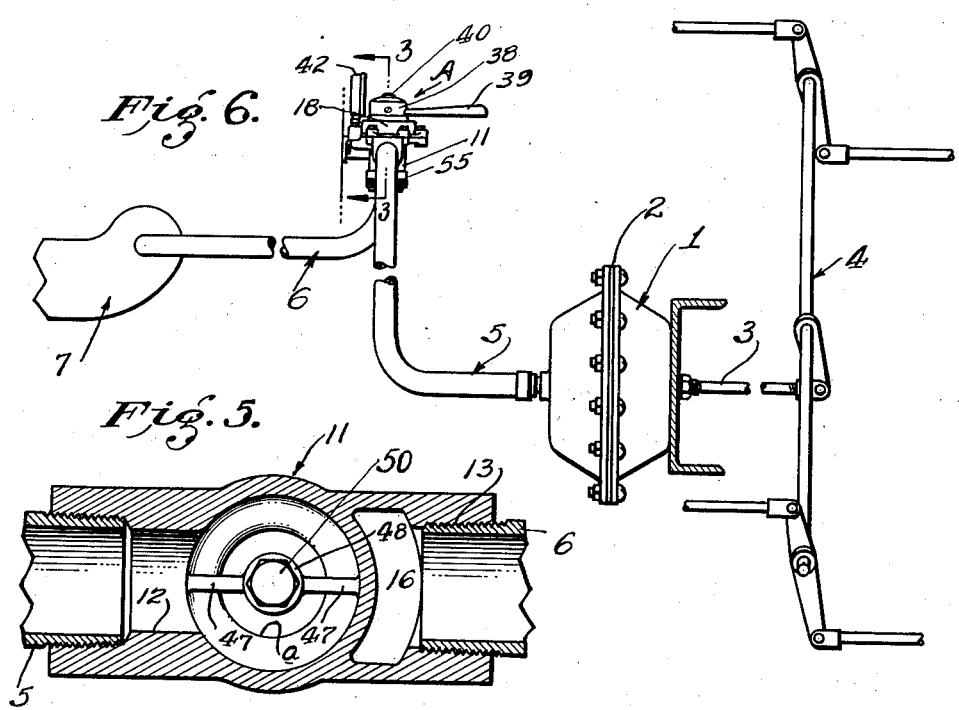
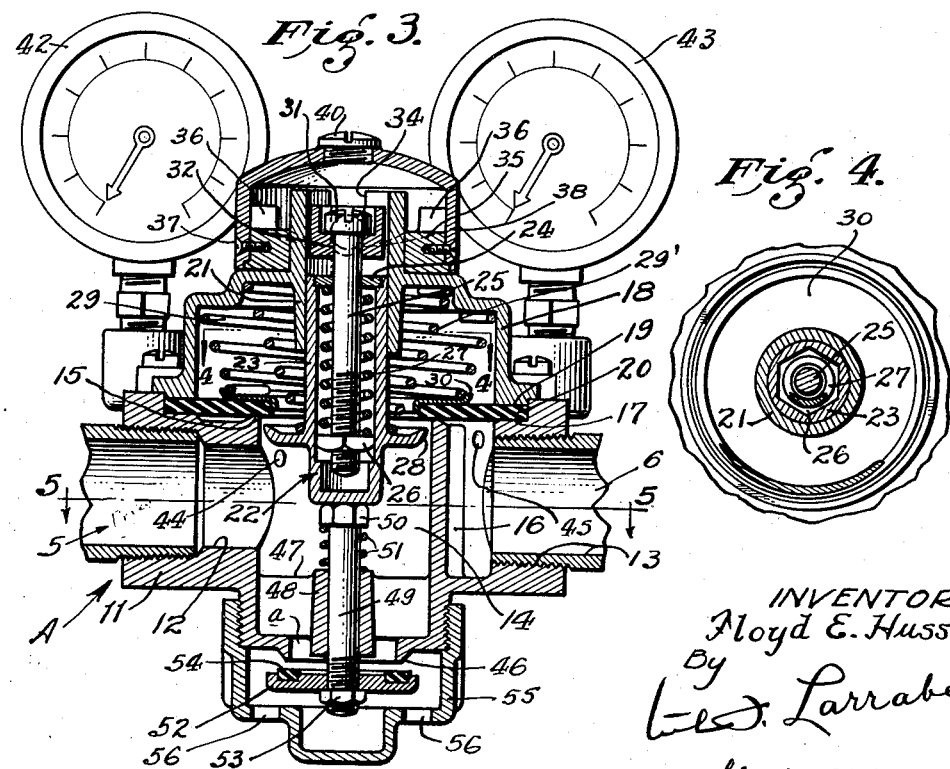

Patented July 16, 1940

2,208,553

UNITED STATES PATENT OFFICE 2,208,553

CONTROL VALVE FOR VACUUM OPERATED BRAKES

Floyd E. Hussong, Los Angeles, Calif.

Substitute for abandoned application Serial No. 71,641, March 30, 1936. This application January 20, 1938, Serial No. 185,979

8 Claims. (Cl. 303—54)

This invention relates to hand operated control valves for vacuum operated brakes, particularly to control valves for vacuum responsive apparatus, wherein the suction created in the intake manifold of an internal combustion engine is utilized to cause operation of brakes or other equipment of a vehicle such as a passenger car, truck, or trailer.

An object of this invention is to provide a control valve of this character which is so arranged that its control handle may be moved in either direction to cause operation of the brake apparatus thereby eliminating any possibility of confusion to the driver and also providing one device whereby an operator that may be either left or right handed may conveniently operate the same.

Another object is to provide a control valve of this character which may be readily and quickly adjusted to insure the most desirable brake action under all conditions; and to compensate for weight of any load being carried or to maintain the most satisfactory brake action for wet, icy or dry roads.

Another object is to provide a control valve of this character which incorporates a main valve and a relief valve arrangement wherein the relief valve is held open by the main valve when the main valve is in its sealing position and in which the relief valve is automatically closed upon opening of the main valve, thus insuring equalized pressure in the booster units until it is desired to actuate the brakes, even though the main valve should leak.

Another object is to provide a valve structure for vacuum brake apparatus which is particularly simple of construction and of operation, and which may be readily serviced without being disconnected, the valve elements being arranged to facilitate removal and replacement.

A further object is to provide a control valve of this character, which though easily adjusted and serviced, is so arranged as to minimize unauthorized tampering.

The invention resides in the parts and combination of parts hereinafter more particularly described and pointed out in the appended claims.

This application is a substitute for my prior application Serial No. 71,641, filed Mar. 30, 1936.

Other objects, advantages and features of invention may appear from the accompanying drawings, the subjoined detail description and the appended claims.

The accompanying drawings illustrate the invention in the form I at present deem preferable.

Fig. 3 is a sectional view of my control valve taken on line 3—3, Figs. 1 and 6, showing the parts in the position assumed when the control valve is in its neutral position, the main valve being closed and the air relief valve being open.

Fig. 4 is a fragmentary transverse sectional view looking down on the main valve diaphragm and taken on line 4—4, Fig. 3.

Fig. 5 is another fragmentary transverse sectional view taken on line 5—5, Fig. 3, and looking down upon the air relief valve.

Fig. 6 is a substantially diagrammatical view showing my control valve in association with a vacuum brake apparatus, in which are shown a portion of the intake manifold, a booster unit, and the equalizer bar together with the brake rods which extend therefrom.

Figure 1:
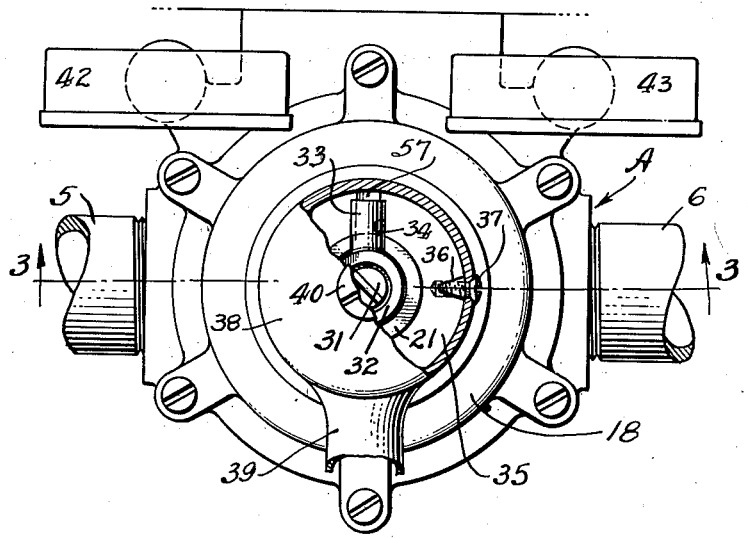
Figure 1 is a plan view of my control valve with the operating handle shown fragmentarily and a portion of the cap forming the operating end of the handle broken away and in section.
Figure 2:
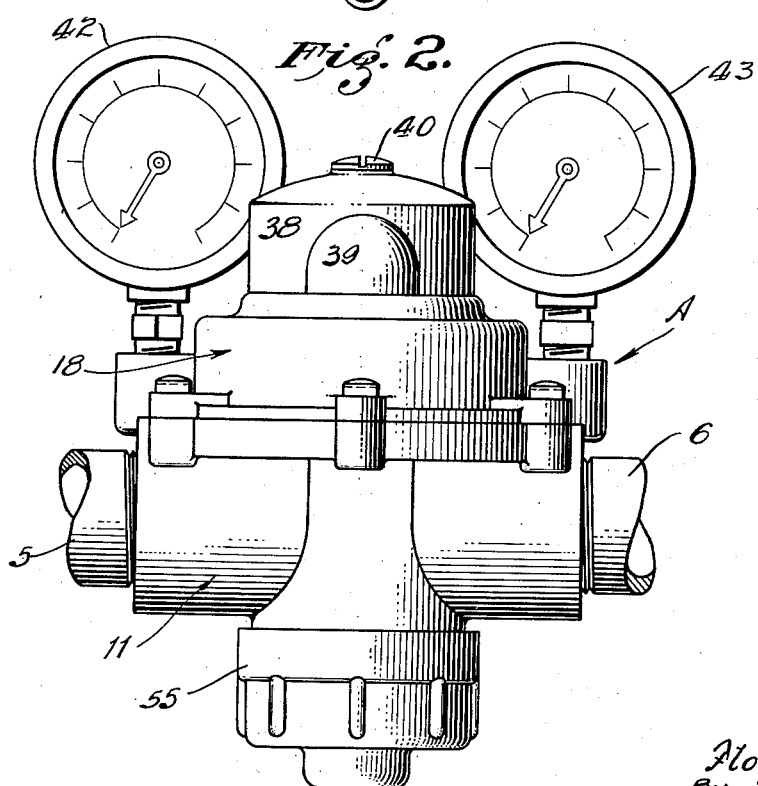
Fig. 2 is a front elevational view of my control valve.

The vacuum brake apparatus with which my control valve is associated comprises one or more booster units 1 each of which is provided with a diaphragm 2 connected mechanically through a rod 3 to the equalizer bar 4 or other suitable member of the braking system of the vehicle. The other side of the diaphragm 2 forms a wall of a chamber which is connected by a pipe 5 to my control valve A, which in turn is connected through a pipe 6 to the intake manifold 7 of an internal combustion engine or to a sub-atmospheric pressure tank, not shown.

The pipes 5 and 6 fit into a housing 11 of my control valve, the housing being provided with alined, internally threaded openings 12 and 13 respectively. The opening 12 intersects the side wall of an air chamber 14 which is open at its upper end to form a valve port provided with a valve seat 15 therearound. The other opening 13 intersects a vacuum chamber 16 defined in part by the wall of the cylinder 14 and which is likewise open at its upper end.

The upper end of the housing 11 is enlarged to form a diaphragm seat 17 which embraces the valve port and chamber 16. A shell 18, having a complementary seat 19 fits over the housing 11. Between the seats 17 and 19 is clamped the margin of a flexible diaphragm 20, preferably formed of rubber, or analogous material preferably designed to withstand oil and the like.

The shell 18 is in centered relation over the diaphragm 20 and incorporates a sleeve 21 which extends both upwardly from the shell and downwardly toward but clear of the diaphragm. The sleeve 21 receives a valve lifting member 22 comprising a hollow stem portion 23 guided in the sleeve and having a polygonal shaped bore. The ends of the stem portion are closed, the upper end by a disk 24 through which extends a shaft 25. The lower or inner end of the shaft 25 is threaded to receive a nut 26 which is held from turning by the polygonal shaped bore in which it slideably fits. A spring 27 is interposed between the disk 24 and nut 26, so that upward movement of the shaft 25 acts through the spring 27 to raise the valve lifting member 22.

The diaphragm 20 is apertured to receive the lower end of the member 22, and below the diaphragm, that is, within the air chamber 14, the valve lifting member is provided with a flange 28 which is slightly upturned at its margin and which engages the diaphragm 20, when raised, to lift the same off from its seat 15. The diaphragm normally rests upon valve seat 15 to separate the vacuum chamber 16 from the air chamber 14 and thereby seal communication between pipes 5 and 6.

The diaphragm 20 is yieldingly held in its sealing position by a spring 29 mounted between the diaphragm and upper end of the shell 18 and surrounding the sleeve 21. The spring 29 is relatively large and an equalizing plate 30 slightly dished at its periphery is interposed between the spring and diaphragm.

A spring 29' operating between the upper end of shell 18 and flange 28 normally urges the valve lifting member 22 downwardly so that the flange 28 is normally spaced from the diaphragm 20.

The upper end of the shaft 25 is provided with a head 31 slotted to receive a screw driver and adapted to retain a collar 32 on the shaft. The collar is provided with a pair of diametrically disposed arms 33, one of which is shown by dotted lines in Fig. 3 and in elevation in Fig. 1. The arms 33 extend through slots 34 provided in the upper end of the sleeve 21 and engage a cam ring 35 which journals around the protruding upper end of the sleeve 21. The cam ring is provided with two diametrically disposed low and high points on its upper surface upon which the arms 33 ride, so that with the arms initially engaging the low points of the cam ring, movement of the cam ring in either direction will raise the collar 32 and consequently the shaft 25. The shaft in turn, operating through the spring 27, causes the flange 28 to raise the diaphragm 20 off from seat 15. Stops 36 are provided at the high points of the cam ring.

Fitted over the cam ring 35 and secured thereto by set screws 37 is a cap member 38 from which extends a lateral handle 39. The cap member 38 is apertured above the shaft 25 and receives a plug screw 40 which, when removed permits access to the head of the shaft 25 for adjusting the tension of spring 27.

For the purpose of determining the pressures in the pipe lines 5 and 6, gauges 42 and 43 are connected with the air chamber 14 and vacuum chamber 16 by ports 44 and 45 respectively.

The lower end of the air chamber 14 is provided with a port a smaller than the port defined by the valve seat 15 and is provided with a down turned marginal lip forming a valve seat 46. Above the valve seat 46 the air chamber 14 is provided with an integral spider 47 having a centered guide sleeve 48. A stem 49 is slidably mounted in the sleeve 48, its upper end is provided with a head 50. Between the head 50 and sleeve is interposed a spring 51. The lower end of stem 49 is threaded to receive a disk shaped valve member 52 that is secured in position on stem 49 by a lock nut 53. The periphery of the valve member 52 is provided with an annular, valve face ring 54 preferably formed of flexible material.

The member 52 and valve seat 46 form a relief valve to permit atmospheric pressures to be maintained on opposite sides of the diaphragm 2 in the booster unit 1.

The lower end of the air chamber 14 is enclosed by a cup-shaped guard shell 55 having apertures 56 therein. The valve member 52 controls communication between the atmosphere and the pipe 5 leading to the booster unit 1. The spring 51 tends to normally urge the valve member 52 into closed position; however, when the valve lifting member 22 is in its normal or lower position, it engages the head 50 at the upper end of the stem 49, and holds the valve member 52 in open position as shown in Fig. 3. In this connection, it should be noted that the spring 51 is sufficiently weak to yield to the weight of the valve lifting member 22 and the tension of the spring 29' exerted thereagainst.

To facilitate centering of the arms in the low points of the cam ring 35 radial notches 57 may be provided at such low points. Thus, the initial movement of the valve lifting member may be relatively rapid.

Operation of my hand control valve is as follows:

When the handle 39 is in its neutral position as shown in the drawings, the diaphragm 20 is held closed by the spring and by reason of the sub-atmospheric pressure existing in pipe 6, and vacuum chamber 16 to which the margin of the diaphragm outwardly of the seat 15 is exposed. In such neutral position, the valve member 52 is open so that the line 5 and the vacuum chamber of the booster unit is exposed to the atmospheric pressure, whereby an equalized pressure against opposite sides of the diaphragm of the booster unit is insured.

Upon turning the handle 39 in either direction, the diaphragm lifting member 22 is raised, first releasing the valve member 52 so as to close communication between the pipe line 5 and the atmosphere. Continued movement of the handle causes the lifting member 22 to raise the diaphragm 20 off of the valve seat 15 causing air to be exhausted from the pipe line 5 and creating a pressure difference in the booster unit which causes its diaphragm 2 to act upon the braking system of the vehicle through the rod 3.

Adjustment of the spring 27 regulates the amount of pressure differential in the booster unit and consequently the tension on the brake apparatus. Thus, by increasing the tension of spring 27 a greater pressure differential occurs between the pipe line 6 and pipe line 5 before diaphragm 20 is forced onto the seat 15 against the action of the spring 27 and the spring 29.

I claim:

1. A control valve for vacuum brakes, comprising a housing structure having a chamber communicating with the vacuum responsive elements of a vacuum brake apparatus, a second chamber surrounding the first chamber, said chambers communicating at corresponding ends, and a valve seat interposed between the communicating ends of the chambers; a diaphragm covering both of said chambers and engageable with said valve seat to isolate one chamber from the other; a relief valve in said first chamber for opening the chamber to the atmosphere; means tending to hold said relief valve closed; a diaphragm lifting means adapted to occupy a neutral position free of said diaphragm and in engagement with said relief valve to hold the same open, and to occupy an operating position free of said relief valve and in engagement with said diaphragm to open communication between said chambers.

2. A control valve for vacuum brakes, comprising a housing structure having a chamber communicating with the vacuum responsive elements of a vacuum brake apparatus, a second chamber surrounding the first chamber, said chambers communicating at corresponding ends, and a valve seat interposed between the communicating ends of the chambers; a diaphragm covering both of said chambers and engageable with said valve seat to isolate one chamber from the other; a relief valve in said first chamber for opening the chamber to the atmosphere; means tending to hold said relief valve closed; a diaphragm lifting means adapted to occupy a neutral position free of said diaphragm and in engagement with said relief valve to hold the same open, and to occupy an operating position free of said relief valve and in engagement with said diaphragm to open communication between said chambers; an operating member for said lifting means; and a yieldable element interposed between the operating member and said lifting means to permit seating of the diaphragm in opposition to the urge of said lifting means.

3. In a control valve for vacuum brakes, a valve housing defining, a cylinder having ports at opposite ends, the first port being open to the atmosphere, a chamber communicating with the other port of said cylinder, said chamber being connected with a region of sub-atmospheric pressure, and a conduit intersecting said cylinder between said ports and communicating with vacuum responsive elements of a vacuum brake apparatus; a relief valve for said first port, means tending to close said relief valve; a flexible diaphragm positioned to control communication through the other port between said cylinder and said chamber; and operating means for opening either of the ports of said cylinder to connect said vacuum responsive elements with atmospheric pressure or with said region of sub-atmospheric pressure.

4. In a control valve for vacuum brakes, a valve housing defining, a cylinder having ports at opposite ends, the first port being open to the atmosphere, a chamber communicating with the other port of said cylinder, said chamber being connected with a region of sub-atmospheric pressure, and a conduit intersecting said cylinder between said ports and communicating with vacuum responsive elements of a vacuum brake apparatus; a relief valve for said first port, means tending to close said relief valve; a flexible diaphragm positioned to control communication through the other port between said cylinder and said chamber; and operating means extending into said cylinder and movable in one direction to engage said diaphragm and open the port controlled thereby, and movable in the other direction to engage and open said relief valve; an actuator for said operating means; and a yieldable means interposed between said actuator and said operating means to permit closing of said diaphragm in opposition to the urge of said operating means.

5. In a control valve for vacuum brakes; a pair of complementary housing members; a diaphragm clamped therebetween; an annular valve seat in one of said housing members engageable with said diaphragm and defining an internal port and an external port, one communicating with a vacuum responsive element of a vacuum brake apparatus, and the other communicating with a region of sub-atmospheric pressure; a guide in the other housing member; a diaphragm lifting member slidably mounted in said guide and extending through the diaphragm into the internal port; an operating means for said lifting member; a yieldable link between said operating means and lifting member responsive to movement of the diaphragm in opposition to the lifting member; a relief valve associated with the port communicating with the vacuum responsive element; means normally urging said relief valve closed; and a device connected with said lifting member for holding said relief valve open when said diaphragm is seated on said valve seat.

6. In a control valve for vacuum brakes, a yieldable diaphragm, one side exposed to atmospheric pressure; a housing member covering the other side of the diaphragm and defining a central port and an annular port separated by a diaphragm seat engageably by said diaphragm to isolate one port from the other, the annular port communicating with a region of sub-atmospheric pressure whereby a pressure differential is maintained on said diaphragm urging the same against said diaphragm seat, the central port communicating with a vacuum responsive element of a brake apparatus; a relief valve for exposing said vacuum responsive element to the atmosphere; means urging said relief valve to a closed position; and an operating means movable to engage and open either said diaphragm or said valve.

7. In a vehicle brake apparatus incorporating a brake actuating device responsive to sub-atmospheric pressure and adapted to be connected to a region of sub-atmospheric pressure, of a control valve structure interposed between said device and said region comprising; a housing defining a chamber communicating with said device, a valve element for connecting said chamber with said region of sub-atmospheric pressure, a control for variably positioning said valve element; means operative in opposition to said control and responsive to pressures in said brake actuating device and said chamber for disconnecting said chamber from said region of sub-atmospheric pressure; and relief valve means for opening said chamber to atmospheric pressure, said relief valve being engageable by said control alternatively with said valve element.

8. In a vehicle brake apparatus incorporating a brake actuating means responsive to sub-atmospheric pressure and connected to a region of such sub-atmospheric pressure; a control valve interposed between said means and said region having a valve element urged to a seated position in response to sub-atmospheric pressure in said region and said brake actuating means; manually operable, yieldable, operating means for opening said valve elements to connect said region with said brake actuating means; a relief valve communicating with said brake actuating means for exposing the same to atmospheric pressure; and means tending to close said relief valve, said operating means engageable with said relief valve when said valve element is closed to hold said relief valve open.

FLOYD E. HUSSONG.